United States Patent
Vandevijver et al.

(10) Patent No.: US 6,558,761 B1
(45) Date of Patent: May 6, 2003

(54) PERACID-STABLE POLYMERIC CONTAINERS

(75) Inventors: Eric Vandevijver, Woluwe-Saint-Lambert (BE); Lesley A. Williams, GB-Warrington (GB); Michel Lequeux, Brussels (BE); Michael E. Walton, Tervuren (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/555,212
(22) PCT Filed: Nov. 19, 1998
(86) PCT No.: PCT/EP98/07529
§ 371 (c)(1), (2), (4) Date: Jun. 30, 2000
(87) PCT Pub. No.: WO99/28379
PCT Pub. Date: Jun. 10, 1999

(30) Foreign Application Priority Data

Nov. 27, 1997 (GB) ................................................ 9724942

(51) Int. Cl.⁷ .............................................. B29D 22/00
(52) U.S. Cl. ...................................... 428/35.7; 428/35.8
(58) Field of Search ................................ 428/35.7, 35.8

(56) References Cited

U.S. PATENT DOCUMENTS 3,921,333 A * 11/1975 Clendinning ................. 47/37
5,928,745 A * 7/1999 Wood et al. ............... 428/36.8

FOREIGN PATENT DOCUMENTS

| EP | 0 737 566 | 10/1996 |
| GB | 2 251 845 | 7/1992 |
| JP | 63130648 | 6/1980 |

* cited by examiner

Primary Examiner—Cynthia H. Kelly
Assistant Examiner—Lawrence Ferguson
(74) Attorney, Agent, or Firm—Larson & Taylor PLC

(57) ABSTRACT

Containers or linings formed from thermoplastic polymeric materials are provided which are suitable for use in transport and storage of aqueous oxidizing agents and the thermoplastic polymeric materials themselves. The thermoplastic polymeric materials such as polyethylene, forming the container or linings are stabilized against embrittlement caused by interaction with peracid solutions they contact by the incorporation of a thioether and preferably a hindered phenol anti-oxidant. The thioether particularly comprises additionally a hindered phenol and is, for example, a thiobisphenol. The stored peracid solutions exhibited improved storage stability. The containers or linings are particularly suitable for storing or transporting aqueous peracid solutions in locations enjoying relatively high ambient temperatures.

20 Claims, No Drawings

PERACID-STABLE POLYMERIC CONTAINERS

This invention concerns containers or linings for containers, particularly those which employ polymeric materials, and especially containers or linings which are intended for the transportation and storage of oxidising agents.

In recent years the distribution of solutions of oxidising agents and particularly aqueous solutions in small containers has increased dramatically. This is particularly true in the realm of disinfection and sanitisation, where the well known efficacy of microbicidal agents, combined with increasingly stringent regulations concerning health and safety in industries such as agriculture, healthcare, and food processing, has led to a greater awareness of their potential. They also find increasing usage in the home environment as for example toilet cleaners and hard surface cleaners.

On the large scale, the oxidising agents can be transported in containers such as intermediate bulk containers (IBC's) holding around 1,000 liters which can be re-used. The internal surfaces of these containers are usually specially designed and manufactured from materials which are resistant to oxidation, and which moreover do not affect the stability of the oxidising agent. Often they are formed from special grades of steel or alternatively from synthetic organic polymeric material. For many uses, particularly in the household, it is essential that the oxidising agent be provided in smaller containers, holding less than 25 liters, and often less than one liter, which are often employed for a single trip, in which case, the use of stainless steels would be both impractical and too expensive. The use of glass for small containers could be contemplated, but this would be an undesirable material for a number of both economic and practical reasons. First, glass containers are inherently fragile, and often need to be supplied surrounded by a suitable absorbent packing material which is preferably capable of not only reducing the chance of breakage but also safely taking up and holding any contents which are released accidentally. Secondly, special grades of glass would often be required to be suitably compatible with the contents. Thirdly, inner surface pre-treatment would often be necessary to prevent or reduce destabilisation of the contents. Moreover the contents would preferably be protected from damaging parts of the sun's radiation such as ultra-violet, by incorporation of a pigment or UV absorbent in the glass or by an outer wrapper. Glass is also unsuitable for squeezable containers used for household consumer products, typically squeezed to eject their contents onto a surface to be treated or into poorly accessible places such as under the rim of a conventional water closet.

In view of the known foregoing disadvantages of the listed materials, it has become commonplace for household-size containers to be made from organic polymeric compounds. These not only have the advantage of being cheaper in some instances, but in the case of thermoplastic polymers, they are capable of being moulded to any desired shape at higher temperature, and then retaining this shape on cooling. This allows them to be formed into containers that are easily handleable, and from which the contents can be poured out easily without undue inconvenience to the user. The methods of forming the containers are well known in the art, for example blow-moulding, injection moulding, thermoforming, solid-phase pressure forming or rotomoulding. The container walls can have a suitable thickness to enable the container to be rigid during normal storage, but sufficiently flexible to allow it to be deformed reversibly by hand squeezing. It also allows them to be formed into aesthetically pleasing shapes to appeal to customers, for example in a supermarket. Such materials are also easily coloured with dyes and pigments, which can be useful for product distinction.

However, there can be problems associated with such polymeric materials when they remain in contact for extended periods of time with an aggressive oxidising agent. Potentially the most dangerous of these problems is degradation of the container itself and a reduction of its mechanical properties. A loss of plasticity, often referred to hereinafter as embrittlement, can lead to rupture of the container when subjected to pressure, such as during stacking, squeezing or upon impact. It scarcely needs to be said that this is highly undesirable both from the economic perspective of product loss, but more importantly from a safety perspective, because any adjacent person, be he customer or operator, would be put at severe risk of sudden and unplanned contact with the chemical contents. The process of embrittlement can be significant in cooler climates, but is accelerated in hot climates or locations that enjoy high ambient temperatures.

To counteract adverse consequences, a number of industrial standards and specifications have been drawn up which govern the properties of polymeric materials for use with oxidising agents, and some of these have been codified into national and international laws and regulations.

It is well known that various additives can be incorporated into organic polymeric materials in order to retard or inhibit autoxidation of the polymeric chains. Such additives are usually added to the polymer prior to its being shaped into a desired form. It is not sufficient, however, in practice to consider the effect of the additives solely on the polymeric material. It is important to recognise that additives incorporated into container materials come into contact and interact with the contents of the container. Where the contents comprise oxidising agents, such additives can cause oxidising agents to decompose. This is disadvantageous, irrespective of whether the decomposition is rapid or slow. First, rapid decomposition can lead to a rapid increase in pressure inside the container which could cause its rupture and is thus unsafe. Secondly, the gradual loss of active oxidising agent is undesirable with regard to product quality and is thus economically undesirable. Thirdly, the reaction of an additive with contents leads to a lowering of the additive content in the polymeric material wall, with consequential loss of protection for the material. Consequently, the container needs protection from chemical attack to an extent that is unnecessary when the container is employed for water or other benign materials.

It is of further practical importance for at least some household applications that any additive is capable of passing current criteria with regard to food and drug regulations. This is especially relevant where the package contents are to be used directly on foodstuffs, or for sterilising or disinfecting work surfaces or medical instruments.

Several methods of preparation of the polymers employable in the current invention involve the use of a transition metal catalyst at some stage of the polymerisation process. It might be expected therefore, that incorporation into the polymer of substances which are normally regarded in the art as stabilisers for oxidants, such as peroxygens, and which are usually accepted as being effective due to their ability to chelate transition metals, would lead to stabilisation of an oxidant in contact with the polymer. It has been found surprisingly that incorporation of such a stabiliser into the polymer can result in an increased rate of loss of oxidant during storage. This is obviously undesirable because as well as stabilising the polymer towards embrittlement, it is important that any additive incorporated therein does not destabilise the container contents causing decomposition, which would have consequences as explained above.

A solution of a peracid is commercially available in a thermoplastic container which on analysis comprises a hindered phenol, which is a member of the class of materials known to act as antioxidants. The shelf-life of the container is more limited than is desired when filled with the peracid. This is an inconvenience in cold climates and is a distinct constraint on distribution within warm climates or storage in warehouses or by the customer at above room temperature, commonly taken as 20° C. Accordingly, it would be attractive to find a means of lengthening the shelf life of a container for oxidants like peracids.

JP 63130648-A discloses the use of a mixture of anti-oxidants comprising a hindered phenol and a phosphite ester, along with an optional phosphonite ester to stabilise a polyolefin during fabrication at high temperatures of eg above 300° C. However, it provides no teaching as to whether such a stabilised polymer might or might not be suitable as a container for long term storage of a strong oxidising agent solution.

Research Disclosure N$^{o.}$ 327025-A (Shell Oil Co.) discloses that polybutylene when stabilised with two hindered polyphenols is suitable for storing hypochlorite or hydrogen peroxide solutions. Testing has shown that a similarly stabilised polyalkylene with two polyphenols in contact with oxidising agents did not enjoy a significantly increased shelf life in comparison with the same polyalkylene when stabilised with a single hindered polyphenol.

Some antioxidants are known which are stated to act by reacting with peroxides. Their suitability for incorporation in containers for oxidant materials and in particular for peroxidic materials is, in view of their mechanism of operation, at best questionable, with an expectation of mutual self-destruction by interaction with the contents.

A more complex means to overcome or ameliorate the problem has been to provide multilayered containers in which the more labile polymers or additives are separated from the container contents by an interposed layer or layers of less labile material. This is disclosed in EP 0,737,566-A1 (The Procter & Gamble Company) and GB 2,251,845-B (Kao Corporation). These proposals however do not directly address the problem of how to provide a stabilised polymeric material which is not only resistant to embrittlement in contact with liquid oxidative chemicals, but also does no cause undue decomposition of the container contents.

It is an object of the present invention to provide a thermoplastic material for use as a container or a lining for a container for oxidants which ameliorates or overcomes one or more of the difficulties or problems identified hereinbefore.

It is an object of some embodiments of the present invention to provide a thermoplastic polymeric material having improved compatibility with aqueous peracids.

It is an object of certain or further embodiments of the present invention to provide a thermoplastic container made from a thermoplastic polymeric material containing an aqueous solution of a peracid and having an improved life expectancy.

According to one aspect of the present invention there is provided a container made from or lined with a thermoplastic polymeric material, containing or suitable for containing an aqueous solution of a peracid characterised in that the thermoplastic polymeric material comprises an anti-oxidant comprising a thioether.

According to a related process of the present invention, there is provided a process for extending the shelf life of an oxidant in contact with a container or lining made from a thermoplastic polymeric material characterised by incorporating within the material an anti-oxidant comprising a thioether.

The thioether enables an anti-oxidant containing it to function via a non-radical process. Notwithstanding that it theoretically renders the anti-oxidant susceptible to oxidation by oxidant species such as hydroperoxides, the anti-oxidant comprising the thioether enhances the resistance of the thermoplastic container to embrittlement promoted by its contents, such as specifically peroxy acid contents.

The anti-oxidant can comprise a thioether without a further group that contributes to its anti-oxidant capability, or it can contain a free radical scavenging group. The latter is beneficial in that it enables the anti-oxidant to function additionally as a metal deactivator.

Organo-sulphur anti-oxidants which comprise a thioether but do not comprise a free radical scavenger include alkyl sulphides and in particular dialkylsulphides. The alkyl substituent can optionally be itself substituted by an aryl, eg phenyl or phenylene group, or by a heteroatom such as oxygen forming an ether or ester linkage. A particularly attractive sub-class of thioethers comprise alkylthioalkanoates, and especially dialkylthiodialkanoates. The alkyl group is usually at least C8, often up to C24. When present, the alkanoate is often C2 to C4. Examples of alkylthioakanoates and alkyl sulphides to be contemplated include dilaurylthiodipropanoate, distearylthiodipropanoate, dioctadecylthiodipropanoate and dioctadecyldisulphide.

Organo-sulphur anti-oxidants for employment herein can advantageously additionally comprise a free radical scavenger such as a hindered phenol group. The hindered phenol can be substituted directly on the sulphur, or can be linked via an interposed alkylene group, which itself may include a hetero-oxygen linkage from, for example, an ester. In such thioethers the hindered phenol group can comprise at least two alkyl substituents disposed around the nucleus, which are the same or different and normally each contains from 1 to 6 C atoms, and preferably at least one of which contains at least 4 carbons, such as t-butyl and at least one hydroxyl substituent, which advantageously is para to the linkage to the sulphur. The linkage can comprise an alkylene group often containing from 1 to 10 carbons, and in a number of instances from 3 to 7 carbons, optionally itself containing an interposed oxygen within the alkylene chain that is part of an ester linkage.

Two sub-classes of thioethers or practical value for use in the present invention can be represented by the formulae below:

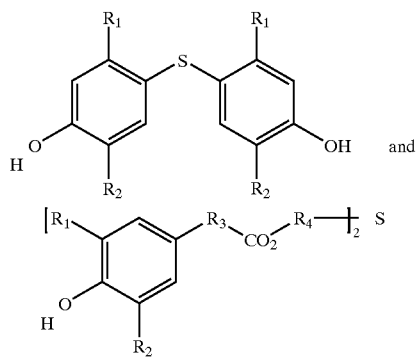

in which $R_1$ and $R_2$ each represent an alkyl C1 to C6, and preferably at least one represents a tertiary alkyl substituent such as t-butyl. Examples of these compounds are phenol, 4,4'-thiobis[2-(1,1-dimethylethyl)-6-methylphenol], 2,2'-thiobis[6-(1,1-dimethylethyl)-4-methylphenol] and 4,4'-thiobis[2-(1,1-dimethylethyl)-5-methylphenol]. Preferred is 4,4'-thiobis[2-(1,1-dimethylethyl)-5-methylphenol].

The thiophenol anti-oxidant can be employed together with a free-radical scavenger/metal deactivator, and especially with a hindered phenol anti-oxidant. A non-exhaustive and non-limiting list of compounds which are capable of acting as free radical scavengers or metal deactivators include: alkylidenebisphenols of general formula:

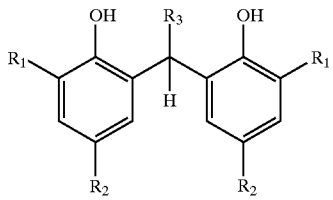

where $R_1$ and $R_2$ are either the same or different and can be alkyl, aryl, or alkylaryl groups comprising 1–9 carbon atoms, and where the alkyl group may additionally comprise a cycloaliphatic ring, and where $R_3$ is either H, or methyl. Preferred for $R_1$ and $R_2$ are t-butyl, cyclohexyl, and methylcyclohexyl groups.

Further alkylidenebisphenols which may be likewise contemplated have the general formula:

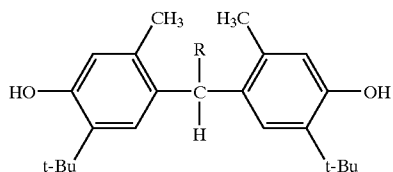

where R is n-propyl or 2-((3-t-butyl-4-hydroxy-6-methyl) phenyl)-propyl. Also worthy of consideration are alkylphenols of general formula:

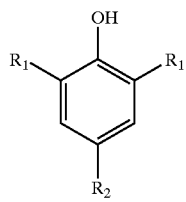

where $R_1$ can be t-butyl, 1-phenylethyl, or 2-phenylpropyl and where $R_2$ can be alkyl, aryl, or alkylaryl groups comprising 1–9 carbon atoms, and where the alkyl group may additionally comprise a cycloaliphatic ring.

A yet further group of hindered phenol free radical scavenging anti-oxidants which can be considered are hydroxybenzyl compounds of general formula:

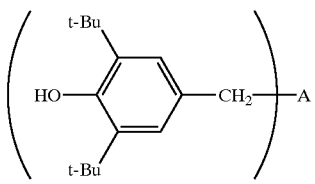

where A can be

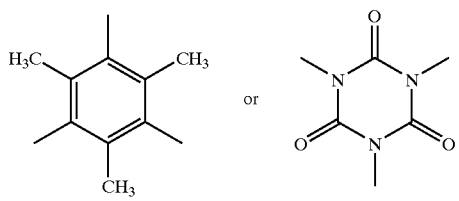

A further class of free radical scavengers which can be contemplated for employment together with the thioether antioxidant comprises amines. Such amines are often selected from dialkylphenylamines and diaralkylphenylamines, the alkyl or aralkyl substituent frequently being branched, and the compound in many instances containing from 20 to 40 carbons. Specific examples include di(4-tert-octylphenyl)amine and di(4-(2-phenylpropyl)phenyl)amine.

The thermoplastic polymeric material can also contain one or more other antioxidants which can be of any known in the art. These antioxidants can for instance be the so called "primary" antioxidants, which are usually incorporated in commercial polymers.

In practice, by virtue of the thermoplastic material containing the thioether and preferably also the hindered phenol and any other anti-oxidants, the lifetime of the container or lining can be prolonged when in contact with peracid solutions at temperatures that are usually encountered during storage and/or transportation, for example temperatures of from around −10° C. to around 50° C. Advantageously, it has been found that the stability of the peracid contents in contact with such stabilised thermoplastic materials can also be preserved or enhanced, and it has been observed particularly with the use in combination of a primary and mixed anti-oxidant stabilised polyalkylene. It is especially beneficial that not only the lifetime of the container itself but also the shelf-life of its oxidant contents are improved by employing the invention combination of additives to the polymeric material by comparison with incorporating a primary anti-oxidant additive alone.

The thioether anti-oxidant when incorporated into the polymer is usually present in an amount of from about 0.05 to about 0.4% by weight of the polymer, and preferably from about 0.15 to about 0.3% by weight.

The hindered phenol and/or amine anti-oxidant when incorporated into the polymer is usually present in an amount of from about 0.05 to about 0.4% by weight of the polymer, and preferably from about 0.07 to about 0.2% by weight.

In preferred embodiments of the invention, the anti-oxidants comprise one or more thioethers anti-oxidants together with at least one hindered phenol, and in a number of especially desired combinations, at least one thioether itself containing a hindered phenol group together with at least one hindered phenol.

The concentration of peracid in the solution housed within the stabilised thermoplastic container or lining normally is up to about 40% by weight, and usually at least 0.1% by weight. It is preferably not more than 35% by weight. In many instances, the peracid solutions comprise from 1–15% by weight peracid and in a number of particularly convenient solutions for storage or transportation in stabilised thermoplastic containers or linings, the peracid concentration is selected in the range of from 2 to 6% by weight, such as about 2.5% or about 5% by weight.

The stabilised polymeric materials containing the combination of anti-oxidants described herein are intended particularly for storage or transportation of aqueous solutions of peracids. The peracids can include inorganic peroxoacids such as Caro's acid ($H_2SO_5$). However, the materials are particularly intended for aqueous solutions of percarboxylic acids. These include low molecular weight aliphatic percarboxylic acids, for example containing up to 6 carbon atoms, of which especially preferred examples comprise peracetic acid and perpropanoic acid. Other examples include perbutyric acid, persuccinic acid, perglutaric acid, and peradipic acid, particularly mixtures of persuccinic, perglutaric and peradipic acids. The percarboxylic acids may also be selected from monoalkyl ester derivatives, such as the methyl and ethyl esters of persuccinic, perglutaric, and peradipic acids. The percarboxylic acid may alternatively be selected from hydroxyperacids, for example perlactic, percitric or pertartaric acid. The peracid may further be selected from the group consisting of aromatic peroxycarboxylic acids, which have the percarboxy group directly attached to an aromatic ring and particularly the more water-soluble aromatic peracids which be substituted by a carboxy or sulphoxy group. Specific examples from this group are monoperoxyphthalic acid and salts thereof, eg magnesium, p-sulphoperbenzoic acid, and salts thereof, eg potassium, perbenzoic acid and pertoluic acid. In a number of most preferred embodiments, the percarboxylic acid is peracetic acid.

The peracid can comprise mixtures of any two or more of the aforementioned peracids, such as a mixture of Caro's acid with a percarboxylic acid, or mixtures of percarboxylic acids such as mixtures of persuccinic, perglutaric and peradipic acids, and/or their monoester derivatives.

The percarboxylic acid solutions contemplated herein for storage and/or transportation within the stabilised thermoplastic materials are often produced by reaction between the corresponding precursor carboxylic acid or its anhydride or ester derivative with aqueous hydrogen peroxide, sometimes in the presence of a strong acid catalyst and optionally at elevated temperature. The percarboxylic acid solutions are often at equilibrium before introduction into the container or they can approach equilibrium with the precursor carboxylic acid and residual hydrogen peroxide during storage.

It will accordingly be recognised that in addition to the percarboxylic acid, the solutions can and usually will additionally contain other components such as the parent carboxylic acid, and residual hydrogen peroxide deriving from the preparation of the percarboxylic acid. The carboxylic acid can be present in an amount that is normally not greater than about 40% by weight and at least 1% of the total weight of solution, and is usually present in an amount of from 5 to 30% by weight. The hydrogen peroxide can similarly be present in an amount that is normally not more than about 40% by weight and at least. 1%, and is more usually be present in an amount selected in the range of from 5 to 25% by weight. It is convenient to employ equilibrium percarboxylic acid solutions and especially equilibrium peracetic acid solutions, particularly solutions containing from 1 to 15% percarboxylic acid and appropriate amounts of the carboxylic acid and hydrogen peroxide, both selected in the range of 3 to 30% by weight. It is especially convenient to employ equilibrium percarboxylic acid solutions and especially equilibrium peracetic acid solutions, particularly solutions containing from 2.5 to 6% percarboxylic acid and appropriate amounts of the carboxylic acid and hydrogen peroxide, both selected in the range of 7 to 25% by weight.

The percarboxylic acid solution can contain one or more percarboxylic acid and/or hydrogen peroxide stabilisers such as for example picolinic acid, dipicolinic acid or quinolinic acid, polyphosphonic acids, such as hydroxyethyldiphosphonic acid or alkylene or cycloalkylene aminomethylene phosphonic acids eg EDTMPA, CDTMPA or DTPMPA and alkylaminecarboxylic acids eg EDTA and DTPA, introduced as such or as a soluble salt. The stabilisers are often present in an amount selected in the range of from 0.1 to 20% by weight. The peracid solution can contain one or more corrosion inhibitors, such as phosphates and/or benzotriazoles, preferably at a concentration that is below a threshold above which extra decomposition is promoted. The percarboxylic acid solution can further contain a strong acid, such as sulphuric acid, employed during its preparation, such as up to 2% and often from 0.1 to 1% by weight, or an acid such as phosphoric acid or sulphamic acid that is incorporated at a suitable concentration to effect acid cleansing. Thickeners and surfactants such as silicates, alcohol ethoxylates, alkyl, aryl and alkylarylsulphonates, alkylsulphates, polyacrylates, quaternary amines, and compounds which contain two or more of these in the same molecule such as amphoterics can also be present, often at a concentration of up to about 10% thickener and/or up to about 20% by weight of surfactant or surfactant mixture.

The polymeric material employed to make the container or lining is a preferably a polyalkylene derived from the polymerisation of an aliphatic alkene containing one or more alkene groups. It is preferred that the polyalkylene is derived from a low molecular weight monoalkene containing from 2–4 carbon atoms. It is particularly preferred that the monoalkene is ethylene. It will be recognised that in order to aid preparation of the polyalkylene, a small amount of a higher molecular weight alkene, or mixture of alkenes containing from 2–8 carbon atoms, is often incorporated into the polymer chain during the polymerisation process.

The polyethylene produced in the preceding particularly preferred option can be further defined in terms of its density. Polyethylenes with a density typically of around 915–940 kg/m$^3$ are usually defined as low density polyethylenes, whereas those with a density of around 940–965 kg/m$^3$ are typically defined as high density polyethylenes.

According to some embodiments of the current invention a high density polyethylene is employed. Although high density polyethylene from any process can conceivably be used, those which made using the so-called Ziegler polymerisation process or the so-called Phillips polymerisation process are especially suited to be used in the current invention. Of those, methods, it is particularly preferred to use polyethylene produced using the Phillips polymerisation process.

One of the significant features of the polymerisation method which is employed is the catalyst system, which manifests itself in the residual concentration in the resultant polymer of transition metal catalyst, and particularly titanium salt catalyst. For the manufacture of containers or container linings intended for contact with oxidant liquids and especially solutions of peracids, it is particularly suitable to select a polyalkylene, specifically a high density polyethylene in which its residual titanium catalyst is less than 2 and preferably less than 0.5 ppm by weight calculated as Ti metal. It is especially desirable to employ the selected low residual titanium catalyst polyethylene in combination with incorporation of the selected thioether such as thiobisphenol or alternative thioether anti-oxidant.

According to certain preferred embodiments of the invention, the thermoplastic container or lining is made from a high density polyethylene, preferably having a residual titanium catalyst concentration of below 0.5 ppm by weight as Ti metal, which contains from about 0.08–0.12% by weight of a hindered polyphenol and from about 0.22–0.28% by weight of a thioether such as a thiobisphenol, and it is intended for containing peracetic acid and especially an equilibrium solution containing from 2.5 to 6% by weight peracetic acid. In particularly preferred embodiments, the thiobisphenol is 4,4'-thiobis[2-(1,1-dimethylethyl)-5-methylphenol].

According to further embodiments of the current invention, a low density polyethylene is employed. These are usually prepared via a high pressure process.

In addition to the additives given above, the polymer may also contain other types of additives. These include pigments and fillers which alter the appearance and opacity of the polymer. Such pigments are selected in accordance with their known compatibility with thermoplastics intended for the storage and transportation of fluids, taking into account the climatic conditions where they are transported and prevailing ecological and safety issues locally, such as the avoidance of toxic pigments and unsafe mixtures of pigments. Specifically for use in the present containers, selection of pigments additionally takes into account their resistance to oxidation and resistance to acid. Rutile titanium dioxide is a preferred pigment/opacifying agent for white containers. The polymer may also contain a u-v stabiliser, including for example hindered amines.

The antioxidant or antioxidants can be incorporated into the polymeric material at any time prior to its deployment as a container or lining, and either simultaneously or sequentially. For example either or both of the thioether and hindered phenol and/or amine anti-oxidants can be incorporated into the polymeric material shortly before or in the last phase of its manufacture, for example in the course of forming the material into a suitable format, such as crumbs or flakes or dispersed into or with the polymer powder or flakes for supply to plastics processors who will make the container or lining. One convenient method comprises preparing a master batch containing the antioxidant(s). Alternatively, all or the remainder of the anti-oxidant system can be incorporated into the polymeric material shortly before the material is moulded or otherwise formed into its desired shape. It is often convenient to incorporate the hindered phenol anti-oxidant at the stage of manufacturing the polymeric material such as before its distribution as a powder or its conversion into flake or crumb, if the latter should occur, and incorporate the thiother anti-oxidant in a subsequent processing step, eg into or dispersed with the powder, flake or crumb. The precise method and timing of incorporating the anti-oxidant(s) is at the discretion of the manufacturer of the container. It is advantageous to incorporate anti-oxidants into polymeric material which has reached its softening temperature, which for a number of the polyalkylenes and especially polyethylene often means selecting an appropriate temperature in the range of from about 150 to 250° C.

It will be recognised that the invention described herein is expressed in terms of treatments to thermoplastic polymers to increase the life of containers or linings made from them intended for storage of aggressive oxidants such as peracids. The specific thermoplastics polymers chosen may, in practice, impose constraints on the size of container which can be made without support. Low density polyethylene is commonly employed for the production of small containers, such as from 0.1 to liters, but can be contemplated for larger containers, especially if provided with external reinforcement or a holder, whereas high density polyethylene is commonly employed over a much wider range of containers, such as from 0.1 to 1000 liters. The invention is especially suited to containers intended for peracids used domestically or on a small scale in industry, agriculture, animal husbandry, medical establishments and the environment, such as from 0.5 to 25 liters. The container wall thickness is chosen, as usual, taking into account the volume being stored in individual containers.

Having described the invention in general terms, specific embodiments thereof are described in greater detail by way of example only.

Plasticity Measurement

The elongation of the polymers at break was measured in accordance with test given in BS2782, Part 3, Method 320A, (1976) using a Lloyd Instruments L1000R test machine.

Peracid Content

The peracid content of the solutions was determined as follows. The sample whose peracid content is to be determined is diluted in a solution of potassium iodide and ethanediol at −10° C. The iodine liberated by the peracid is then titrated with sodium thiosulphate solution, and the peracid concentration calculated.

EXAMPLE 1

A polymer plate comprising high density polyethylene containing 0.3% by weight of a primary anti-oxidant and a mixed anti-oxidant SANTONOX TBMC™ (4,4'-thiobis[2-(1,1-dimethylethyl)-5-methylphenol]) was prepared by the following method.

High density polyethylene flakes produced via the Phillips process, ie having a residual titanium catalyst content of below 0.5 ppm by weight calculated as Ti, containing 0.1% by weight of a primary anti-oxidant, octadecyl-3,5-di-t-butyl-4-hydroxyhydrocinnamate, and having a density of 945 kg/m³ was dry blended with SANTONOX TBMC™ using a rapid mixer at 1500 rpm for 5 minutes. The blend was then extruded and pelletised using an AXXON™ single screw extruder at a screw speed of 125 rpm and with the following temperature profile: 165, 185, 205, 205, 210, 210, 210° C. The pellets thus produced were then compression moulded into plates at 190° C., with a cooling profile of 15° C./minute.

Comparison 2

A polymer was prepared according to the method described in Example 1, except that 0.3% by weight of a further primary anti-oxidant NAUGARD XL-1™ (2,2'-oxamidobisethyl-3(3,5-di-t-butyl-4-hydroxyphenyl) propionate) was used instead of SANTONOX TBMC™.

Comparison 3

A polymer was prepared according to the method described in Example 1, except that 0.3% by weight of a stabiliser, DEQUEST 2010™ (Nitrilotrimethylene-phosphonic acid ) was used instead of SANTONOX TBMC™.

Comparison 4

A high density polyethylene polymer was prepared according to Example 1 containing the primary anti-oxidant, but with no stabiliser or additional anti-oxidant added.

EXAMPLE 5

Comparisons 6, 7 and 8

Strips of polymer prepared according to Example 1 and Comparisons 2 3, and 4 were immersed in a solution comprising 5% by weight peracetic acid, and stored at 40° C. The peracetic acid solution was replaced as required with fresh solution to maintain a peracetic acid concentration of greater than 4% by weight. Samples were periodically taken and their elongation at break tested as described in the methods given above. The results are detailed below in Table 1:

TABLE 1

| % Elongation of Sample at Break | Percentage Elongation at Break Days | | | | | | | |
|---|---|---|---|---|---|---|---|---|
| | 0 | 40 | 61 | 82 | 103 | 123 | 151 | 180 |
| Example 5 (SANTONOX ™) | 851 | 844 | 870 | 931 | 897 | 878 | 933 | 826 |
| Comparison 6 (NAUGARD XL-1 ™) | 854 | 998 | 18 | — | — | — | — | — |
| Comparison 7 (DEQUEST 2010 ™) | 876 | 941 | 826 | 882 | 953 | 944 | 700 | 27 |
| Comparison 8 (No additional anti-oxidant or stabiliser) | 889 | 914 | <27 | — | — | — | — | — |

From the above Table 1 it can be seen that the samples of Comparisons 6 and 8 very quickly gave low values for the elongation. Such a low value indicates that the sample cannot be stretched much before breakage i.e., it has become brittle. The sample of Comparison 7, a peracid stabiliser, although it does not embrittle until after a longer period of time, still loses its elasticity more rapidly than the sample of Example 5, which shows excellent retention of this property.

EXAMPLE 9

Comparison 10

Strips of polymer prepared according to Example 1 and Comparison 4 were immersed in a solution comprising 15% by weight peracetic acid, and stored at 40° C. The peracetic acid solution was replaced as necessary with fresh solution to maintain a peracetic acid concentration of at least 14% by weight. Samples were periodically taken and their elongation at their break point was measured by the methods described above. The results are detailed below in Table 2:

TABLE 2

| Elongation of Sample | Percentage Elongation at Days | | | | | | |
|---|---|---|---|---|---|---|---|
| | 0 | 27 | 33 | 41 | 43 | 54/5 | 68/9 |
| Example 9 (SANTONOX TBMC) | 851 | 933 | — | 938 | — | 937 | 673 |

TABLE 2-continued

| Elongation of Sample | Percentage Elongation at Days | | | | | | |
|---|---|---|---|---|---|---|---|
| | 0 | 27 | 33 | 41 | 43 | 54/5 | 68/9 |
| Comparison 10 (no additional anti-oxidant) | 842 | — | 860 | — | 581 | 70 | 17 |

From the above results it can be seen that the addition of SANTONOX TBMC™ brought about a substantial improvement in the shelf life of the polyethylene before embrittlement occurred.

EXAMPLE 11

Comparison 12, 13 and 14

Strips of polymer prepared according to Example 1 and Comparisons 2 3, and 4 were immersed in a solution comprising 4.68% by weight peracetic acid, and stored at 40° C. The peracetic acid content of the solution was periodically measured using the method given above. The results are detailed below in Table 3:

TABLE 3

| | Stability of Peracetic Acid Days | | | |
|---|---|---|---|---|
| | 0 | 13 | 41 | 83 |
| Example 11 (SANTONOX TBMC ™) | 4.68 | 4.42 | 4.33 | 3.92 |
| Comparison 12 (NAUGARD XL-1 ™) | 4.68 | 4.40 | 4.33 | 4.03 |
| Comparison 13 (DEQUEST 2010 ™) | 4.68 | 4.34 | 2.97 | 1.21 |
| Comparison 14 (No additional anti-oxidant) | 4.68 | 4.37 | 4.22 | 2.61 |

From the above results it can be seen that the addition of SANTONOX TBMC™ to the polyethylene results in the peracetic acid being more stable than when no additive is present. The incorporation of a well known phosphonate peroxygen stabiliser to the polyethylene, DEQUEST 2010™ was shown to destabilise the peracetic acid relative to no additive being incorporated.

From the results summarised in Tables 1 to 4, it can be seen that by incorporating the combination of primary and mixed anti-oxidant into the polyethylene, a material was obtained which not only improved the lifetime of the material when in contact with a peracetic acid solution, but also increased the shelf-life of the peracetic acid solution itself, in comparison with the other variations tested in which one or other of the two measured properties suffered.

Comparison 15

Example 1 has been repeated except that the antioxidant SANTONOX TBMC™ used in example 1 has been replaced by the antioxidant IRGANOX™ 1010 (tetrakis[methylene (3,5-di-t-butyl-4-hydroxy hydrocinnamate)]methane). The results are shown in Table 4.

TABLE 4

| Elongation of Sample | Percentage Elongation at Days | | | | |
|---|---|---|---|---|---|
| | 0 | 40/42 | 61 | 71 | 82/84 |
| Comparison 15 (IRGANOX 1010) | 887 | 804 | | 1037 | 17 |

What is claimed is:
1. A container retaining an aqueous oxidant solution, the container made from or lined with a thermoplastic polymeric material comprising a thioether anti-oxidant and a residual amount of titanium catalyst of not more than 2.0 ppm by weight calculated as Ti, said thermoplastic polymeric material resistant to degradation by the aqueous oxidant solution, wherein the aqueous oxidant solution comprises an aqueous solution of a peracid.

2. A container according to claim 1, wherein the thioether anti-oxidant comprises additionally a hindered phenol group.

3. A container according to claim 2, wherein the thioether anti-oxidant is 4,4'-thiobis[2-(1,1-dimethylethyl)-5-methylphenol].

4. A container according to claim 1, wherein the thioether anti-oxidant is employed together with a hindered phenol.

5. A container according to claim 1, wherein the thermoplastic material is a polyalkylene.

6. A container according to claim 5, wherein the polyalkylene is obtained by polymerisation of a $C_2$–$C_4$ monoalkene.

7. A container according to claim 6, wherein the polyalkylene is polyethylene.

8. A container according to claim 7, wherein the polyethylene is high density polyethylene.

9. A container according to claim 5, wherein the polyalkylene contains a residual amount of titanium catalyst of below 0.5 ppm by weight.

10. A container according to claim 9, wherein the polymeric material is prepared via a Phillips polymerisation process.

11. A container according to claim 1, wherein the anti-oxidants are each present in an amount of from about 0.05 to about 0.4% by weight of the polymer.

12. A container according to claim 2, wherein the hindered phenol anti-oxidants are present in an amount of from about 0.07 to about 0.2% by weight of the polymer.

13. A container according to claim 11, wherein the thioether anti-oxidant is present in an amount of from about 0.15 to about 0.3% by weight of the polymer.

14. A container according to claim 1, wherein the thermoplastic material comprises an amine anti-oxidant as well as a thioether antioxidant.

15. A container according to claim 1, wherein the thermoplastic polymeric material comprises high density polyethylene, which contains 0.08–0.12% by weight of a hindered polyphenol and 0.22–0.40% by weight of a thiobisphenol.

16. A container according to claim 15, wherein the thiobisphenol is 4,4'-thiobis[2-(1,1-dimethylethyl)-5-methylphenol].

17. A container according to claim 1, wherein the peracid is an aliphatic percarboxylic acid containing up to 6 carbon atoms.

18. A container according to claim 17, wherein the aliphatic percarboxylic acid is peracetic acid.

19. A container according to claim 1, wherein the peracid is chosen from the group consisting of perbutyric acid, persuccinic acid, perglutaric acid, peradipic acid and mixtures of persuccinic, perglutaric and peradipic acids.

20. A container according to claim 1, wherein the peracid is chosen from the group consisting of methyl ester of persuccinic acid, methyl ester of perglutaric acid, methyl ester of peradipic acid, ethyl ester of persuccinic acid, ethyl ester of perglutaric acid, ethyl ester of peradipic acid, and their mixtures.

* * * * *